(12) United States Patent
Sridhar et al.

(10) Patent No.: US 7,512,343 B2
(45) Date of Patent: Mar. 31, 2009

(54) BIDIRECTIONAL COMMUNICATION SYSTEM

(75) Inventors: Balakrishnan Sridhar, Ellicott City, MD (US); Michael Y. Frankel, Baltimore, MD (US); Vipul Bhatnagar, Kensington, MD (US)

(73) Assignee: Ciena Corporation, Linthicum, MD (US)

( * ) Notice: Subject to any disclaimer, the term of this patent is extended or adjusted under 35 U.S.C. 154(b) by 633 days.

(21) Appl. No.: 11/043,087

(22) Filed: Jan. 27, 2005

(65) Prior Publication Data

US 2006/0023754 A1 Feb. 2, 2006

Related U.S. Application Data

(60) Provisional application No. 60/591,095, filed on Jul. 27, 2004, provisional application No. 60/604,487, filed on Aug. 26, 2004.

(51) Int. Cl.
*H04B 10/08* (2006.01)
*H04B 10/12* (2006.01)
*H04B 10/00* (2006.01)

(52) U.S. Cl. .................. 398/147; 398/29; 398/159; 398/160

(58) Field of Classification Search ............ 398/14, 398/83, 85, 67, 81, 82, 29, 147, 159, 160
See application file for complete search history.

(56) References Cited

U.S. PATENT DOCUMENTS

| | | | |
|---|---|---|---|
| 5,280,549 A | 1/1994 | Barnard et al. | |
| 5,311,344 A | 5/1994 | Bohn et al. | |
| 5,361,157 A | 11/1994 | Ishikawa et al. | |
| 5,452,124 A | 9/1995 | Baker | |
| 5,548,438 A | 8/1996 | Delavaux | |
| 5,604,627 A | 2/1997 | Kohn | |
| 5,689,594 A | 11/1997 | Mao | |
| 5,742,416 A | 4/1998 | Mizrahi | |
| 5,801,858 A * | 9/1998 | Roberts et al. | 398/97 |
| 5,815,308 A | 9/1998 | Kim et al. | |
| 5,875,054 A | 2/1999 | Onoda et al. | |
| 5,926,590 A | 7/1999 | Mao | |
| 5,995,259 A | 11/1999 | Meli et al. | |
| 6,018,404 A | 1/2000 | Meli et al. | |
| 6,067,179 A | 5/2000 | Roberts et al. | |
| 6,091,542 A | 7/2000 | Yang | |
| 6,130,775 A | 10/2000 | Yang | |
| 6,381,049 B1 | 4/2002 | Xu et al. | |
| 6,388,805 B1 | 5/2002 | Spock et al. | |
| 6,400,478 B1 | 6/2002 | Cheng et al. | |
| 6,490,386 B1 | 12/2002 | Cao et al. | |
| 6,496,305 B2 | 12/2002 | Spock et al. | |
| 6,728,027 B2 | 4/2004 | Rapp | |
| 6,868,201 B1 * | 3/2005 | Johnson et al. | 385/24 |
| 2002/0021862 A1 * | 2/2002 | Zhou et al. | 385/24 |
| 2002/0089719 A1 * | 7/2002 | Joo et al. | 359/127 |

* cited by examiner

*Primary Examiner*—Dalzid Singh
(74) *Attorney, Agent, or Firm*—Muncy, Geissler, Olds & Lowe, PLLC

(57) ABSTRACT

A bidirectional communication system is disclosed. A single optical line amplifier is used to amplify signals in both the east and west directions. Additionally, a single dispersion compensation module is used to compensate for fiber dispersion in both directions. Using a single optical line amplifier and a single dispersion compensation module for both directions allows for reduction in the number of optical line amplifiers used in a given network.

28 Claims, 17 Drawing Sheets

BIDIRECTIONAL COMMUNICATION SYSTEM

CROSS-REFERENCE TO RELATED APPLICATIONS

This application claims priority under 35 U.S.C. § 119(e) on U.S. Provisional Patent Application No. 60/591,095 filed on Jul. 27, 2004, which is incorporated herein by reference in its entirety and on U.S. Provisional Patent Application No. 60/604,487 filed on Aug. 26, 2004, which is incorporated herein by reference in its entirety.

BACKGROUND OF THE INVENTION

In current large-scale networks, information flows through a series of nodes/network elements in the network from one location or site to another. FIG. 1A illustrates a related art system 100 that has an east 110 and west 140 terminal. The east 110 and west 140 terminals communicate via lines (e.g., optical fiber pairs) that run between the terminal, as illustrated (e.g., lines 152-156 and 162-166). east 110 and west 140 terminals can be located a significant distance apart. Accordingly, line amplifier nodes (e.g., 120, 130) can be interposed between the terminals (e.g., every 40-80 kilometers) to compensate for the signal loss in the transmission medium (e.g., optical fiber) by amplifying the signal. Additionally, associated dispersion compensation modules (e.g., DCMs 122, 128, 132 and 138) can be added to correct for the signal degradation caused by the transmission medium (e.g., dispersion in the optical fibers). Further, to increase the bandwidth available each east and west line can have a plurality of channels communicated on separate wavelengths in different bands (e.g., red and blue), as is known in the art. Generally, the red band can be considered to be a contiguous band of longer wavelengths and the blue band is a contiguous band of shorter wavelengths, within the bandwidth supported by an optical amplifier.

The amplification gain at a given node should typically correspond to the losses incurred in the upstream line. Likewise, the dispersion compensation typically can correspond to the fiber dispersion in the upstream line. Accordingly, methods and systems for measuring the fiber loss and compensating for loss and for compensating for the fiber dispersion are desired in optical communication systems.

In addition to line amplifier nodes, add/drop nodes can be interposed between terminals to allow for the adding or dropping of signals from the lines, as is known in the art. FIG. 1B illustrates a related art optical add/drop multiplexer. Each line (e.g., west to east line 170, east to west line 180) is coupled to an optical line amplifier (OLA) 171, 181, which includes amplifiers and a dispersion compensating fiber (DCF) as is known in the art. The output of the OLA is coupled to a drop element 172, 182. A reconfigurable blocking filter (RBF) 173, 183 is coupled between the drop element 172, 182 and an add element 174, 184. The add element 174, 184 is coupled to post amplifier 175, 185, which compensates for any additional losses due to the drop, RBF and add. The output of the post amplifier is coupled to line 176, 186, which continues to the next node (e.g., east or west terminal, OLA, OADM, and the like) in the transmission path as is known in the art.

However, the bandwidth capacity of the lines (e.g., fiber pairs) connecting the nodes/terminals often is greater than the bandwidth demand. Accordingly, reducing the number of expensive components, such as optical line amplifiers, can improve the system cost and utilization of the existing infrastructure. Scaling equipment costs to demand are important considerations for service providers, network managers and equipment suppliers.

BRIEF DESCRIPTION OF THE DRAWINGS

Advantages of the present invention will be apparent from the following detailed description of the preferred embodiments thereof, which description should be considered in conjunction with the accompanying drawings in which.

DETAILED DESCRIPTION

Aspects of the invention are disclosed in the following description and related drawings directed to specific embodiments of the invention. Alternate embodiments may be devised without departing from the spirit or the scope of the invention. Additionally, well-known elements of the invention will not be described in detail or will be omitted so as not to obscure the relevant details of the invention.

The expression communicates, coupled, connection, and connected as used herein refers to any connection, coupling, link and the like by which optical signals carried by one optical system element are imparted to the communicating element. Further, the devices described are not necessarily directly connected to one another and may be separated by intermediate components or devices.

The term "service channel" as used herein refers to a wavelength of an optical communication system such as a WDM, SONET or SDH-based system that is used to carry operational, administrative, maintenance, and/or provisioning information and is synonymous with "optical supervisory channel", "OSC", "optical service channel" or other industry terms that refer to these functions. A service channel may be "in-band" meaning that the service channel wavelength lies within the data wavelength transmission window of a WDM system (e.g., within the range of about 1500 nm-1590 nm). A service channel may also be "out-of-band" meaning that the service channel wavelength is outside the wavelength transmission window of the WDM system.

Typically, the service channel signal is carried on a wavelength separate from those of the data signals (out-of-band). Examples of service channel wavelengths include, but are not limited to, 1310 nm, 1510 nm and 1625 nm in typical fiber-optic communication systems.

The term "service channel modem" as used herein refers to any device capable of handling the transmission and receipt of a service channel. More specifically, service channel modems handle a service channel that is optically added/multiplexed onto the same fiber as the WDM data signals, using wavelength-multiplexing filters or equivalent. After propagating through an optical fiber link, the service channel signal is optically dropped/demultiplexed from the data signals using wavelength-selective filters or equivalent and detected by an optical receiver in the downstream service channel modem.

Figure 1A:
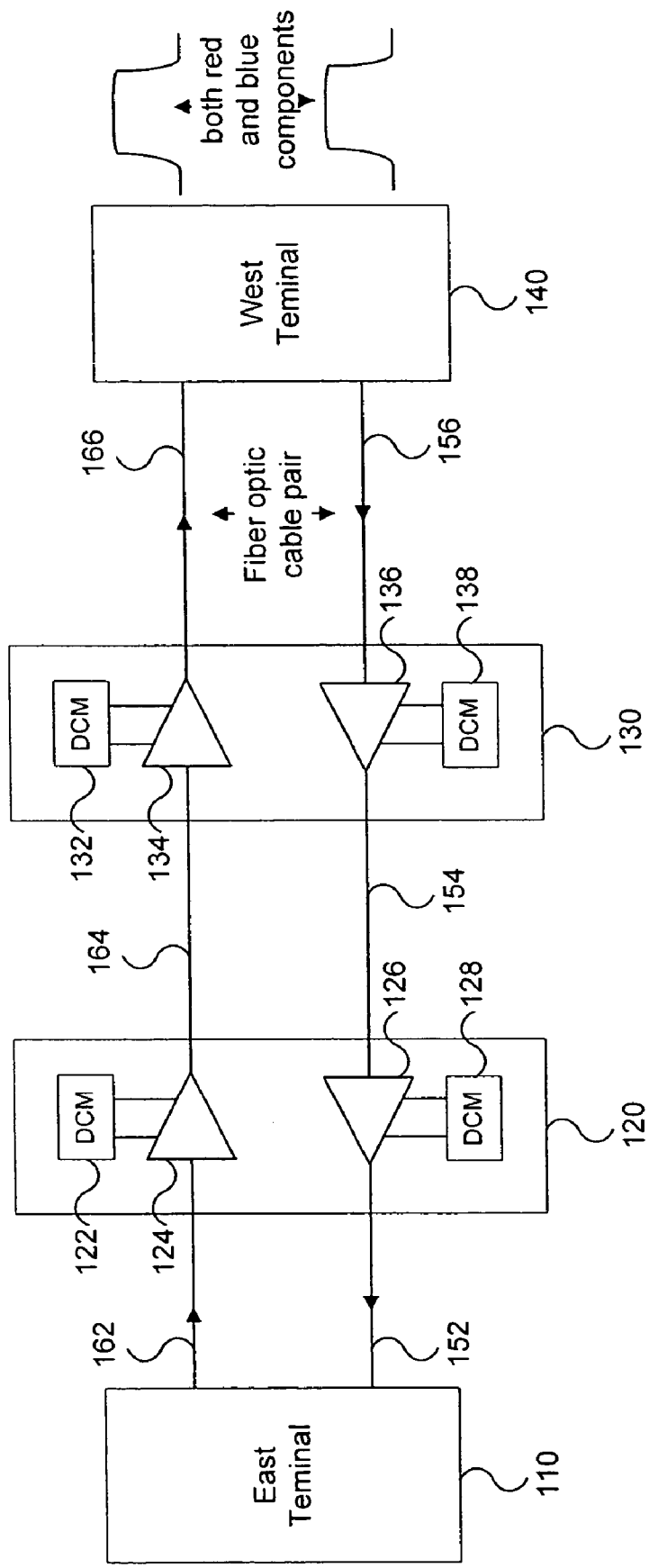
FIG. 1A illustrates a portion of a network configuration in accordance with the related art.
Figure 1B:
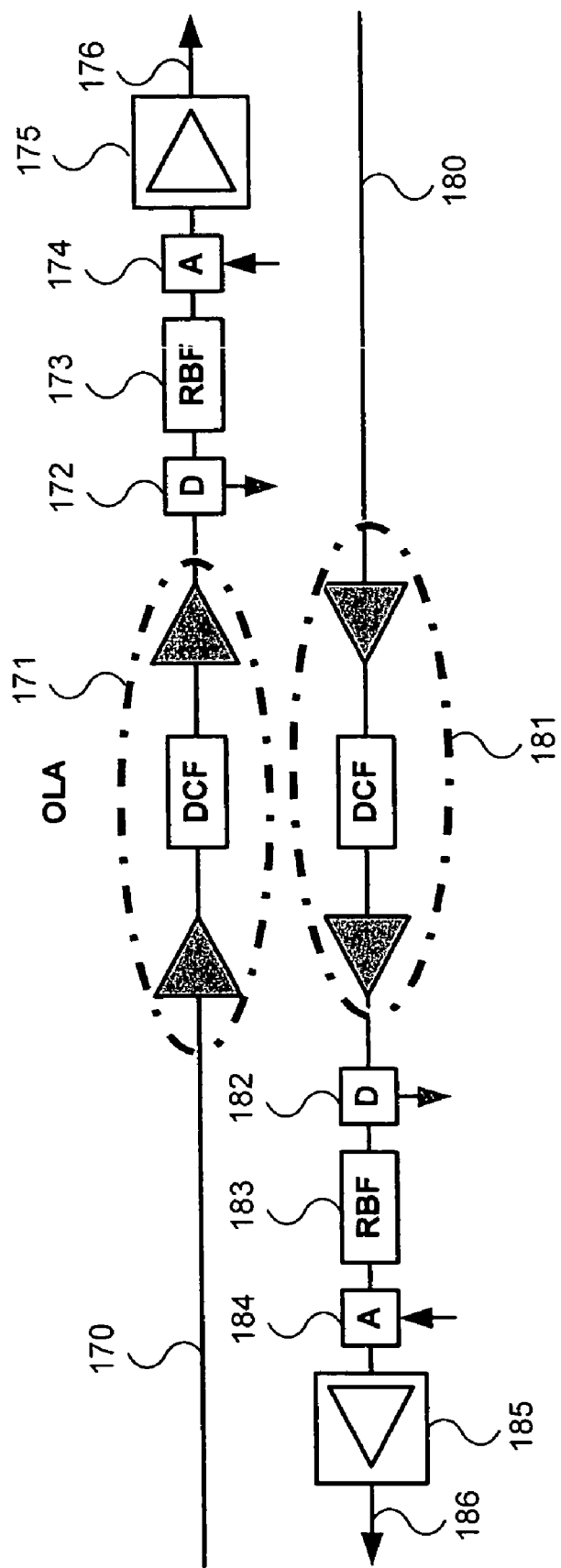
FIG. 1B illustrates optical add/drop multiplexers in accordance with the related art.
Figure 2:
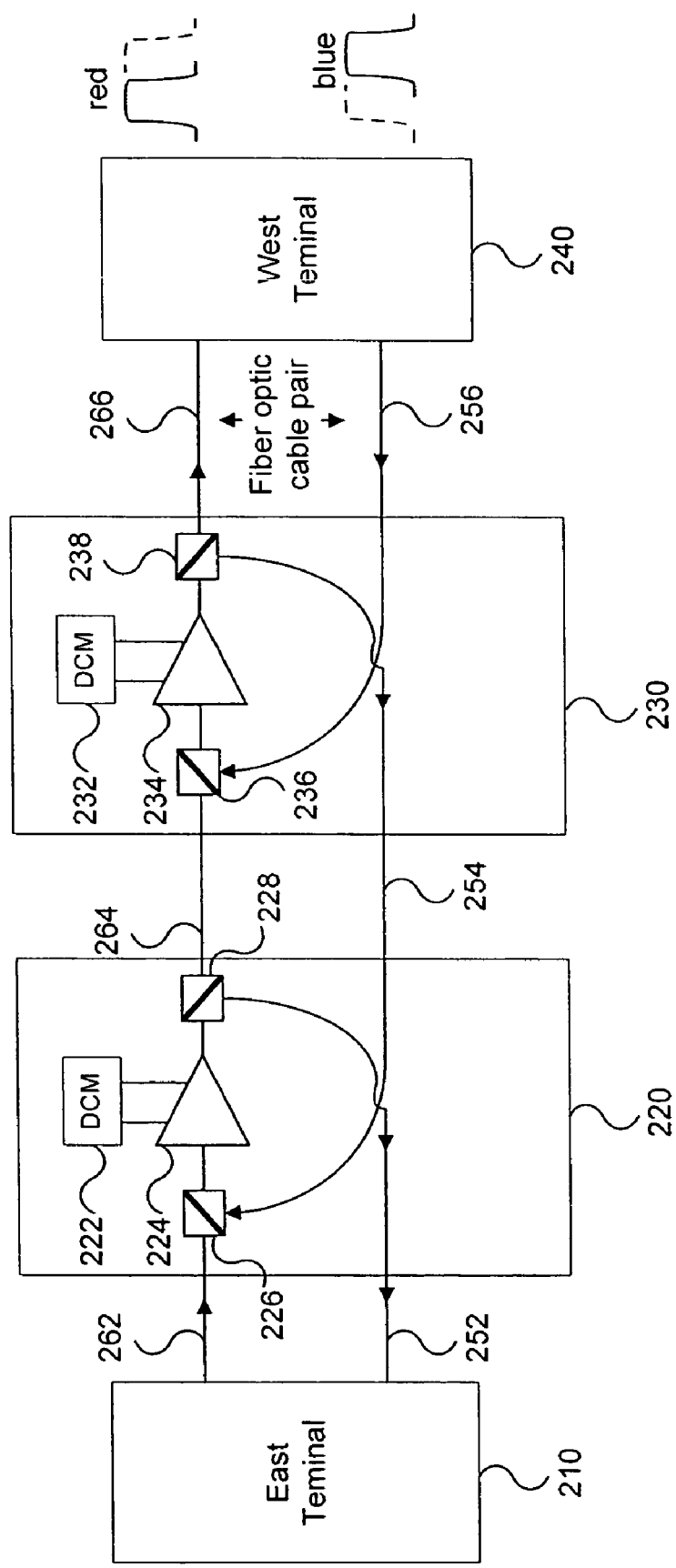
FIG. 2 illustrates a network configuration in accordance with at least one embodiment of the invention.

Referring to FIG. 2, a portion of a network in accordance with at least one embodiment of the invention is illustrated. Network 200 has an east terminal 210 and west terminal 240. The east 210 and west 240 terminals communicate via lines (optical fiber pairs) that run east and west, as illustrated and discussed in relation to FIG. 1A. Further, as previously discussed with regard to the related art, amplifier modules (e.g., 224, 234) can be added to boost the signal, because of the distance between terminals. Likewise, a dispersion compensation module (e.g., DCM 222, 232) can be added to correct for the dispersion in the transmission fiber. However, as illustrated in FIG. 2, the east and west traffic can operate on separate band (e.g., red or blue) and the red and blue signals can be combined (e.g., multiplexer 226, 236) prior to amplification and dispersion compensation (e.g., via DCM 222). Accordingly, since both east to west and west to east signals are combined for amplification and dispersion compensation, one amplifier module (e.g., 224, 234) can be used to amplify signals of both east and west signals at each amplifier node (e.g., 220, 230). The terms red and blue are being used to represent a contiguous band of longer wavelengths and a contiguous band of shorter wavelengths, within the bandwidth supported by an optical amplifier, respectively. Accordingly, the invention is not limited to any specific wavelengths, colors or other such characteristics and these limitations should be not read into the description.

After amplification and compensation, the signals can be separated (e.g., demultiplexers 228, 238) and sent on their respective paths. For example, assume that red band signals are used for east to west traffic and blue band signals are used for west to east traffic for the following illustration. A red signal can travel from the east terminal 210 via line 262, multiplexer 226 that combines red signals from line 262 and blue signals from line 254. In node 220, amplifier module 224 amplifies the signals (both red and blue) and DCM 222 compensates for the fiber dispersion in at least one adjacent line (e.g., 262 and 254) for both the red and blue signals. The combined red and blue signals are transmitted to demultiplexer 228, where they are separated into separate blue and red signals. The red signal continues east to west on line 264 to line amplifier module 230 and the blue signal continues west to east on line 252 to east terminal 210. The red signal on line 264 will go through a similar multiplexing, amplification/compensation, and demultiplexing in optical line amplifier node 230 until the red signal arrives at the west terminal 240.

Figure 3A:
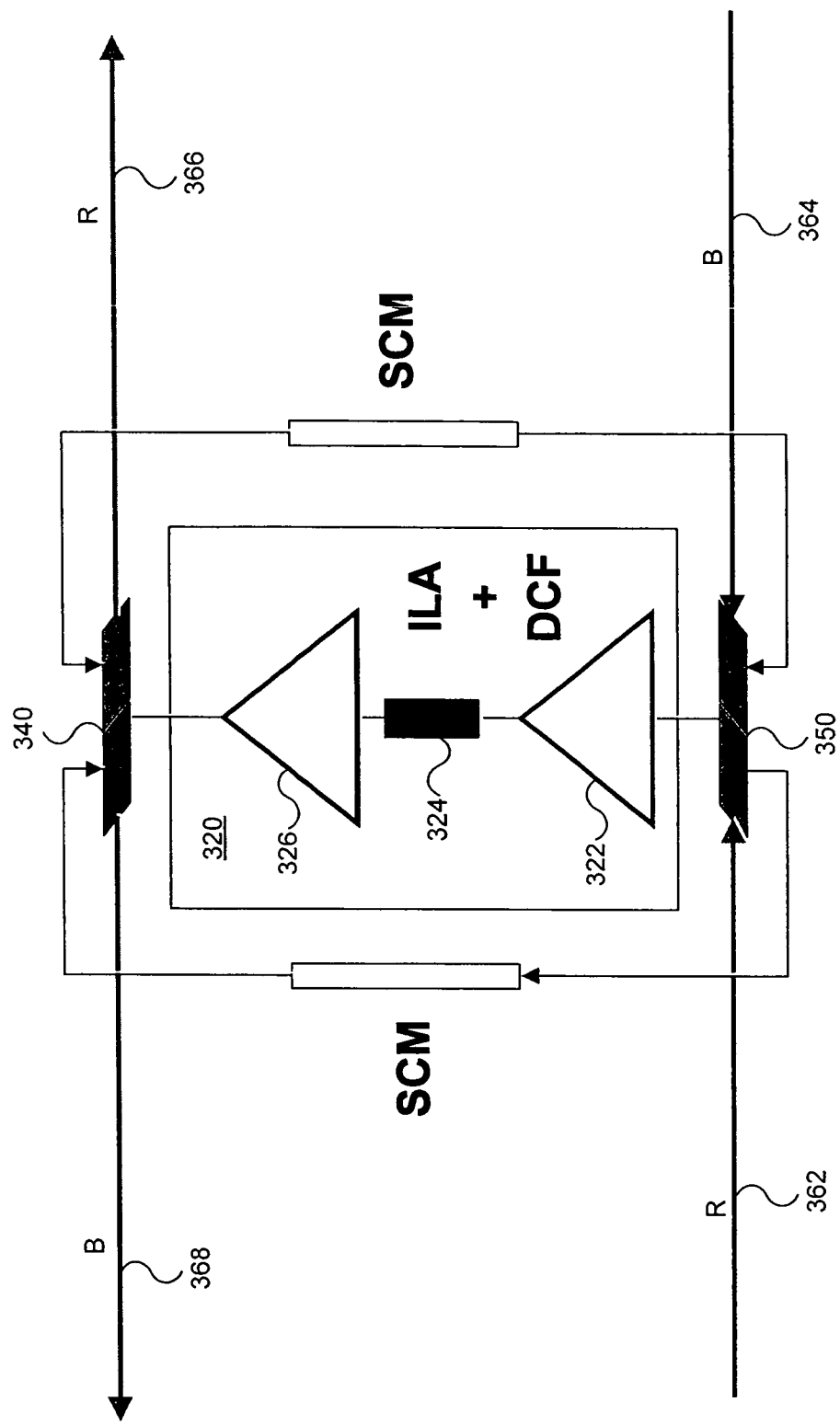
FIG. 3A illustrates an optical line amplifier in accordance with at least one embodiment of the invention.

Referring to FIG. 3A, an optical line amplifier in accordance with at least one embodiment of the invention is illustrated. A signal on red (R) line 362 can enter multiplexer (MUX) 350 where it is combined with signal on the blue (B) line 364. The combined signal is amplified in the preamplifier section 322. The output of preamplifier 322 is coupled to dispersion compensation module 324, which compensates for the fiber dispersion. The output of dispersion compensation module 324 is coupled to post amplifier 326, which provides additional amplification to the combined red and blue signal. The output of post amplifier 326 is coupled to demultiplexer (Demux) 340, where the red and blue signals are separated and propagated on respective fibers 366 and 368 in respective directions (e.g., east to west and west to east).

Additionally, as shown in FIG. 3A, the service channel is dropped off each line (362, 364) and bypasses the amplification and dispersion compensation, as is known in the art. The add/drop connections for the service channel are shown as being integrated into multiplexer/demultiplexer 350 and 340, solely for purposes of illustration. Those skilled in the art will appreciate that the service channel add/drop does not have to be integrated into the multiplexer/demultiplexer and can be performed by separate components. Service channels are well known in the art. Accordingly, a detailed discussion regarding the service channel is not provided herein.

As illustrated and discussed above in relation to FIG. 3A, the dispersion compensation module is shared for signals coming from both directions (e.g., east to west and west to east). Additionally, since each signal in each direction arrives via a different line, the fiber dispersion of each line may not be the same. Accordingly, as disclosed herein, the selection of the common dispersion compensation values at each node and for the system can address this multiple fiber dispersion issue.

Figure 3B:
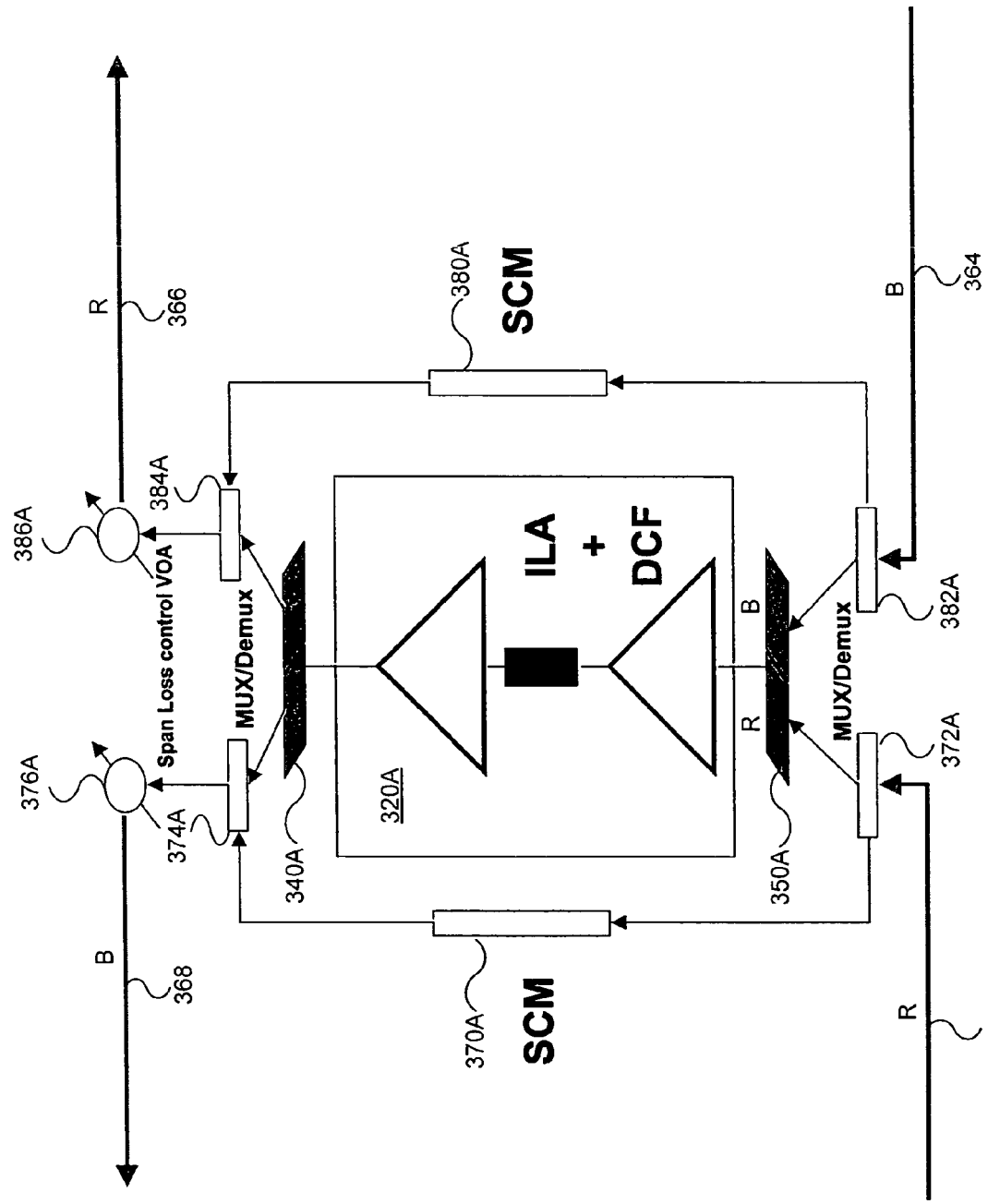
FIG. 3B illustrates an optical line amplifier node in accordance with at least one embodiment of the invention.

Referring to FIG. 3B, an optical line amplifier in accordance with at least one embodiment of the invention is illustrated. As discussed above, signals on red (R) line 362 can enter multiplexer (MUX) 350A where it is combined with the signal on the blue (B) line 364. The combined signal is amplified in amplifier module 320A. The output of the amplifier module 320A is coupled to demultiplexer 340A, where the red and blue signals are separated and propagated on respective fibers 366 and 368 in respective directions (e.g., east to west and west to east).

Additionally, as shown in FIG. 3B, the service channel is dropped off each line (362, 364) and bypasses the amplification and dispersion compensation, as is known in the art. Specifically, drop multiplexers (drops) 372A and 382A (e.g., filters) drop the service channel off incoming lines 362 and 364, respectively. The dropped service channel wavelengths are coupled to photo-receivers of the service channel modems (SCM) 370A and 380A, respectively. The SCM transmitters are in turn coupled to add multiplexers (adds) 374A and 384A, respectively, at the outputs of Demux 340A. In this way, the red and blue service channels incoming from 362(R) and 364(B) will provide feedback back to the node in the direction from which each service channel came, that is, 368(B) and 366(R), respectively.

Variable optical attenuators (VOAs) 376A and 386A can be used to selectively attenuate the gain provided by amplifier module 320A to each respective output. Specifically, VOA 376A can be used to adjust the loss of the span starting at the blue line output 368 and VOA 386A can be used to adjust the loss of the span starting at the red output line 366. Additionally, those skilled in the art will appreciate that the span loss control VOAs 376A, 386A can be located at the input side of the amplifier (either before 372A and 382A, or between 372A and 350A and between 382A and 350A). The span loss adjustment will be discussed in greater detail below.

Figure 3C:
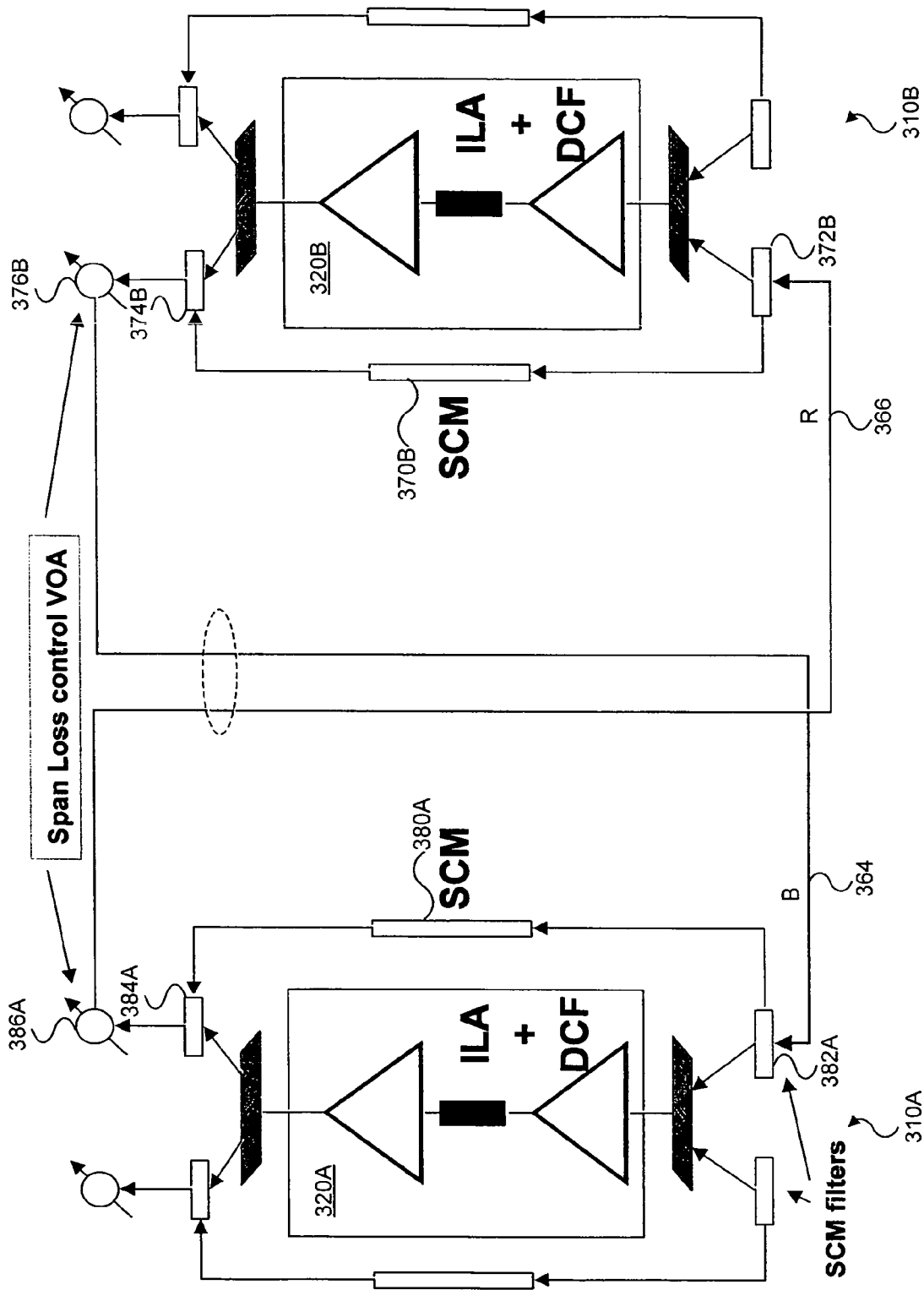
FIG. 3C illustrates a portion of a network configuration having two amplifier nodes in accordance with at least one embodiment of the invention.

As can be seen from FIG. 3B, each SCM receives its signal from one direction (e.g. east on blue 364) and transmits it back to the same direction (e.g., east on red 366). A pair of SCMs, one at each adjacent node, can support a duplex communication link over the two-fiber span, as illustrated in FIG. 3C. Additionally, communication between SCMs at each node can be accomplished using a local backplane in the node. Commonly owned U.S. Pat. No. 6,765,659 entitled "Optical Supervisory Channel Apparatus and Method for Measuring Optical Properties", which is incorporated by reference herein in its entirety, provides additional details regarding using SCMs for power measurement.

Referring to FIG. 3C, a portion of a network comprising two amplifier nodes in accordance with an embodiment of the invention is illustrated. As noted above, there is a duplex link/span of the service channels couple by lines 366 and 364 between the amplifier nodes 310A and 310B. Additionally, since each SCM has a photo-receiver, controller (processor) and the like, each SCM can detect the upstream loss via a power measurement at each SCM (e.g., 380A, 370B) and use this information to adjust the amplifier gain of amplifier module (e.g., 320A, 320B) and adjust the VOA (e.g., 386A, 376B).

For example, assuming the amplifier modules 320A and 320B are managed in a constant gain mode, a span loss measurement can be used to set the amplifier gain of each module 320A and 320B. A SCM power measurement can be used to measure span loss. Then, the corresponding VOAs 386A and 376B can be adjusted based on the SCM power measurements by SCMs 380A and 370B, respectively. Further, the span loss adjustment and SCM power measurement can be performed independent of the rest of the system. This allows for simplified operation and set up of the amplifier nodes (e.g., 310A, 310B) in that the amplifier gain and VOA gain can be established while only the SCMs (e.g., 380A, 370B) are running. Therefore, the entire system does not have to be up and running end to end prior to measuring span loss, setting the amplifier gain and adjusting the VOAs. Additionally, this configuration allows for local amplifier control and VOA balancing. Generally, the blue 364 (e.g., east to west) and red 366 (e.g., west to east) spans should be balanced for optimum performance. The loss balancing can be performed on a span by span basis or balanced over the system end to end or subsections (e.g., multiple nodes) thereof. Therefore, in at least one embodiment of the invention the network can include at least one amplifier node without VOAs, such as illustrated in FIG. 3A.

Accordingly, both the fiber dispersion compensation and span loss adjustment can be addressed in exemplary embodiments of the invention. Those skilled in the art will appreciate that the dispersion compensation and span loss adjustment determinations are complicated because of the common amplification and dispersion compensation. Accordingly, both the amplifier gain adjustment and the dispersion compensation commonly impact the signals in both directions. However, the characteristics of the fiber path on each side of a node are not necessarily the same. Methods for determining the dispersion compensation, amplifier gain and span loss adjustment at each node in view of these considerations are discussed in greater detail in the following description.

Figure 4A:
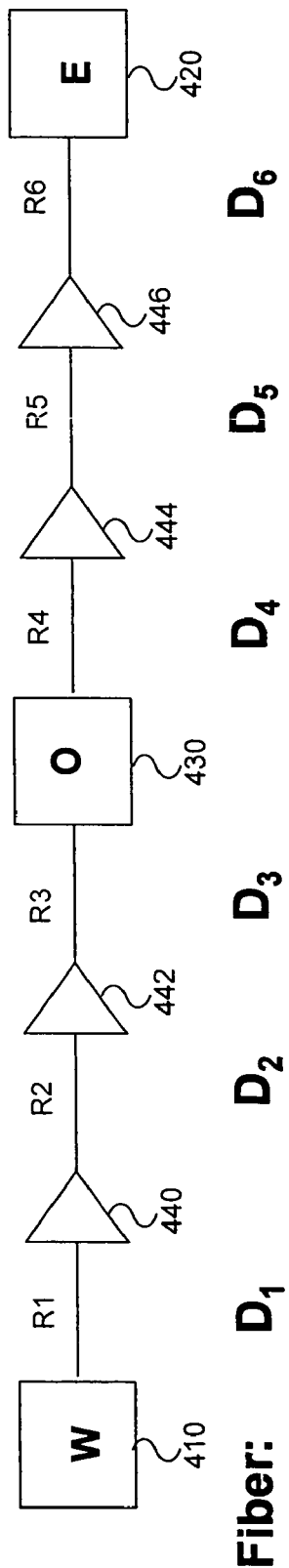
FIGS. 4A-C illustrate dispersion compensation schemes in accordance with embodiments of the invention.
Figure 4A:
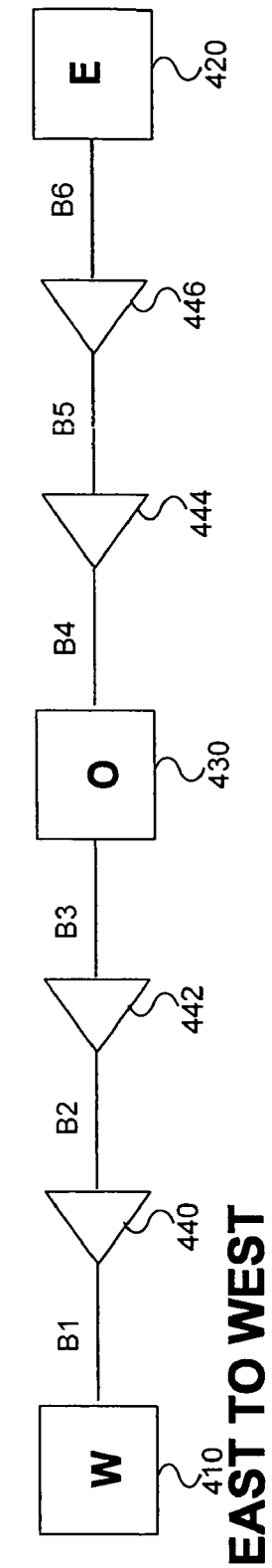

Referring to FIG. 4A, a dispersion compensation scheme according to at least one embodiment of the invention is illustrated. For example, the line dispersion (e.g., fiber dispersion) for each line can be represented as $D_1$-$D_6$. As illustrated, the west terminal transmitter 410 is connected by lines $R_1$-$R_6$ going west to east to east terminal 420 and by lines $B_1$-$B_6$ going east to west from east terminal 420. The lines ($R_1$-$R_6$ and $B_1$-$B_6$) go through amplifier nodes 440-446, and add/drop node 430 to connect west terminal 410 and east terminal 420. To compensate for the fiber dispersion, DCM modules (e.g., a DCF spool) in each node having values $-D_1$ to $-D_6$ can be used to compensate for the fiber dispersion $D_1$ to $D_6$ in the related fiber interconnecting the nodes, as illustrated. Generally, the eastbound dispersion will be substantially similar to the westbound dispersion so one value can be used to compensate for each fiber. For example, amplifier node 440 can have a DCM value of $-D_2$, which compensates for the fiber dispersion $D_2$ in lines $R_2$ and $B_2$. Accordingly, in the illustrated embodiment, dispersion in the east to west direction is post-compensated and the dispersion west to east is pre-compensated. The compensation can be achieved on both directions using an appropriate spool of DCF at each node.

Figure 4B:
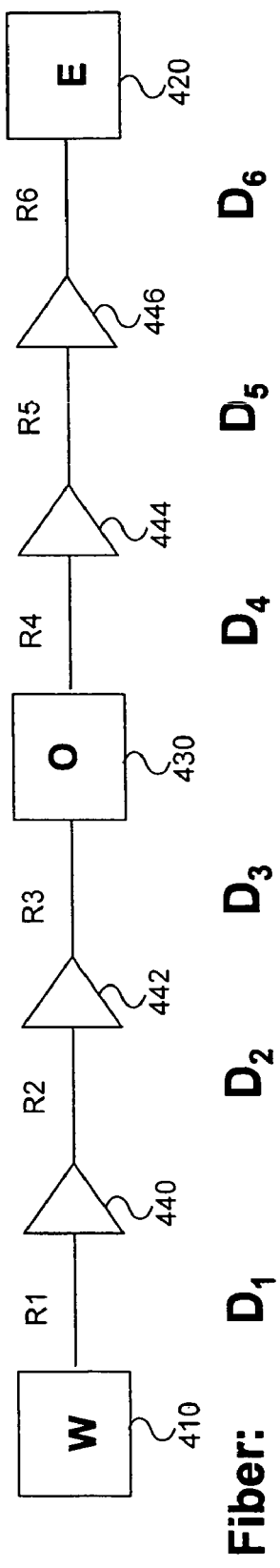
Figure 4B:
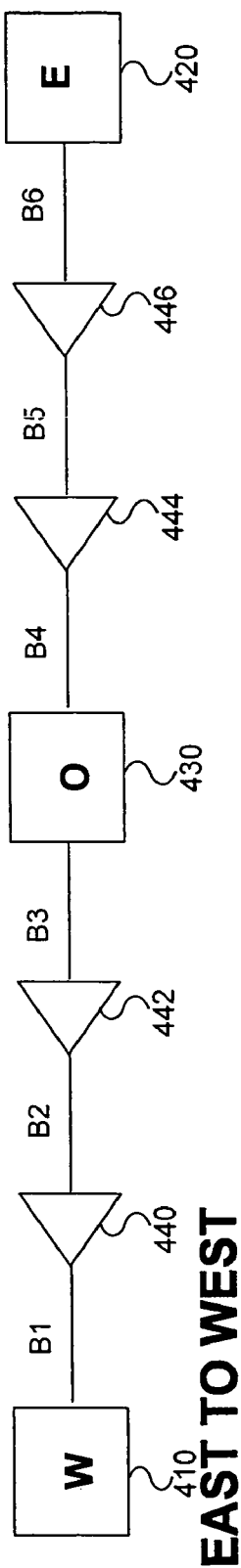

Referring to FIG. 4B, an alternate dispersion compensation scheme is illustrated. In one example, a ratio of the fiber dispersion on lines immediately east and west of the node can be used to compensate for the fiber dispersion. For example, the amplifier node 440 with associated DCM can compensate for a combination of fiber dispersion on each side of the node (e.g., $D_1$ and $D_2$). Accordingly, as illustrated the DCM can be set to $(-D_1-D_2)/2$, which is the average fiber dispersion of $D_1$ and $D_2$. The dispersion compensation ratio (DCR) of 0.5 is used here for illustrative purposes only. The DCR can be different from 0.5 (e.g. 0.0 to 1.0) and can vary along the system. In general the ratio can be defined as:

$$DCR_n = N \cdot -D_{(n-1)} + (1-N) \cdot -D_n, \quad (1)$$

where $D_{(n-1)}$ is the pre-fiber dispersion (e.g., $R_1$ of the first input fiber), $D_{(n)}$ is the post-fiber dispersion (e.g., $B_2$ of the second input fiber), and N can range from 0.0 to 1.0. Alternative ranges can also be defined for example, the range of N could be set to 0<N<1, which would ensure that at least some portion of the dispersion of each fiber was used. This configuration allows for additional fine-tuning of the dispersion map of the system that can be used to optimize the system for minimal non-linearities.

Figure 4C:
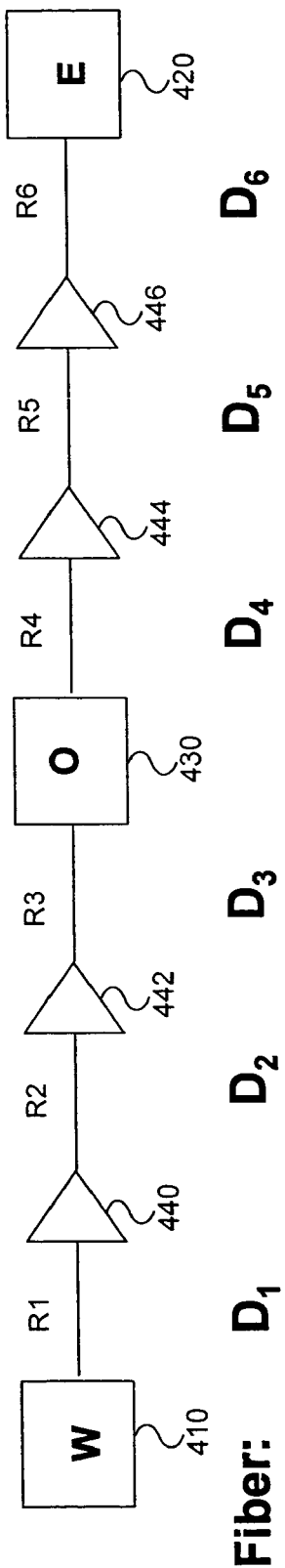
Figure 4C:
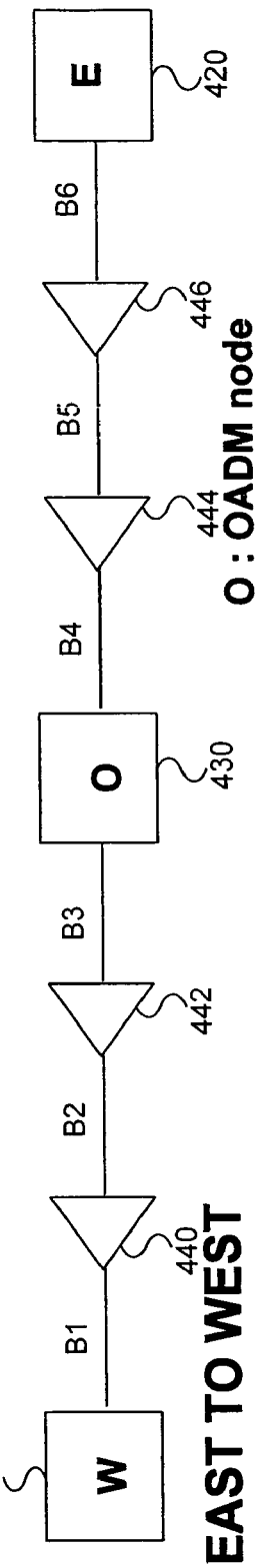

Referring to FIG. 4C, another alternate dispersion compensation scheme is illustrated. In this example a map variable $N_n$ is associated with fiber dispersion values $D_n$, which allows for the optimization of the various dispersion maps. Accordingly, Eq. 1 can be modified as follows:

$$DCR_{(n)} = (1-N_{(n-1)}) \cdot -D_{(n-1)} + (N_n) \cdot -D_n, \quad (2)$$

For example, as illustrated a map variable $N_1$ is associated with fiber dispersion value $D_1$. A map variable $N_2$ is associated with fiber dispersion value $D_2$ and so on for each fiber length interconnecting the various nodes and terminals. The map variables can be used to optimize the dispersion compensation on a fiber by fiber basis so that each node does not have to have the same pre-compensation or post-compensation ratios. Accordingly, each map variable $N_n$ can range from 0.0 to 1.0 and the individual values of each map variable $N_n$ does not have to be the same. For example, $N_1$ can be 0.6 and $N_2$ can be 0.5. Using these values and referring to FIG. 4C, the dispersion compensation value at the west terminal 410 is calculated as $-0.6*D_1$. The dispersion compensation value at amplifier node 440 is calculated as $-(1-0.6)*D_1-0.5*D_2$, which yields $-04*D_1-0.5*D_2$. Accordingly, using independent map variables allows for great flexibility in establishing the pre-compensation or post-compensation for each fiber run.

Further, the compensation scheme depicted in FIG. 4C allows for the prior compensation schemes discussed in relation to FIGS. 4A and 4B to be achieved either through the entire network or on portions of the network. For example, if the values of all Ns are set as 1.0, the compensation scheme illustrated in FIG. 4A will be used. Additionally, by setting the values of all Ns to either 1.0 or 0.0, the pre/post compensation can be changed for each direction. Additionally, the compensation scheme of FIG. 4B can be achieved by setting the value of all Ns to 0.5. However, as discussed above having independent map variables N for each fiber or a subset of fibers allows for greater flexibility in optimizing the various dispersion maps throughout the network.

Figure 5:
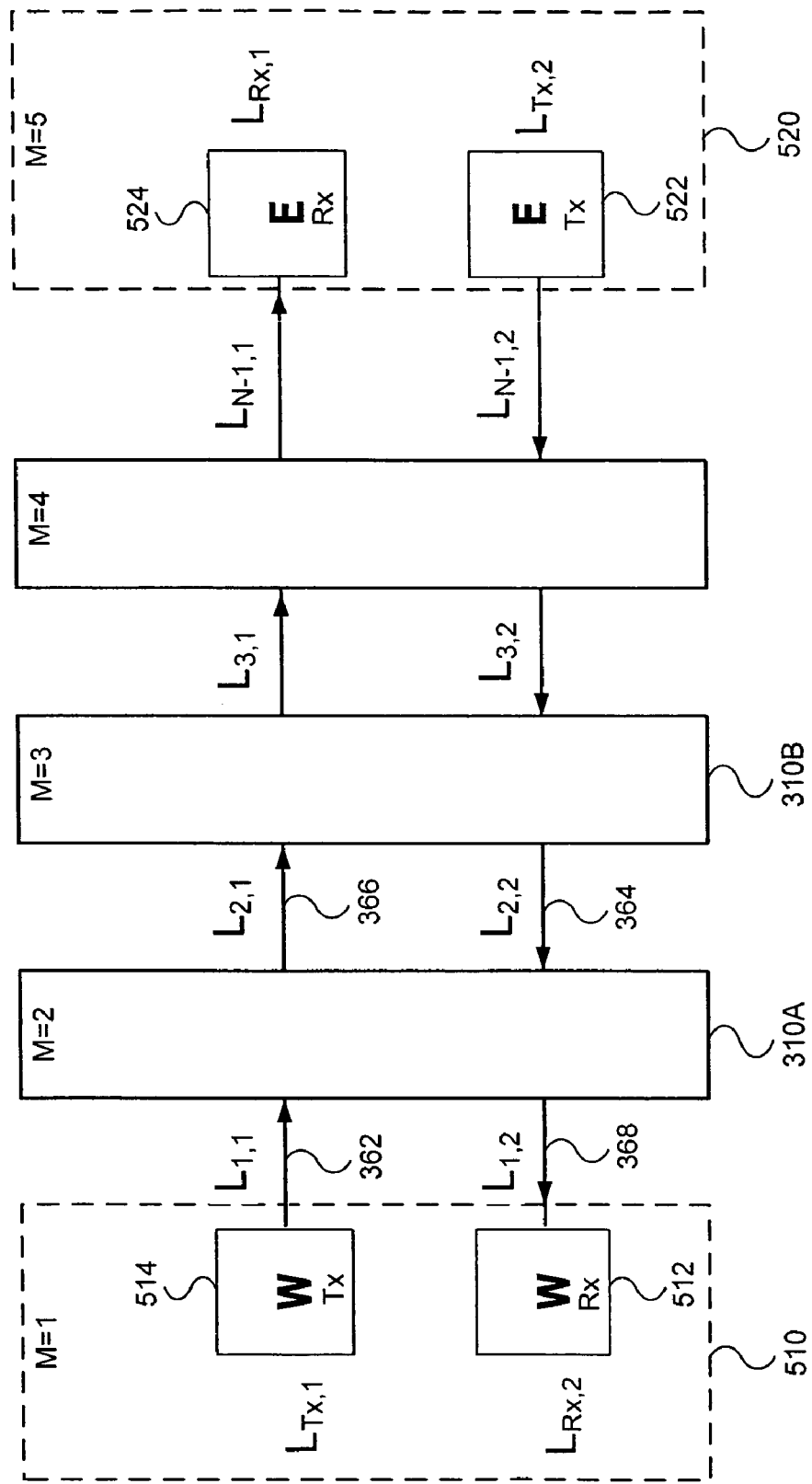
FIG. 5 illustrates a network configuration having multiple nodes and related losses in accordance with at least one embodiment of the invention.

FIG. 5 illustrates a block diagram of a communication system in accordance with an embodiment of the invention. West terminal 510 can include a wavelength multiplexer 512 and a wavelength demultiplexer 514. Likewise, east terminal 520 can include a wavelength multiplexer 524 and wavelength demultiplexer 522. Between the east 520 and west 510 terminals is a plurality of nodes (e.g., OLA, OADM, and the like). Interconnecting the nodes is a plurality of lines and running in each direction interconnecting each node. Associated with each line is a corresponding loss, such as $L_{1,1}, \ldots, L_{(N-1),1}$ which correspond to the fiber loss in west to east direction and $L_{1,2}, \ldots, L_{(N-1),2}$ correspond to the fiber loss in the east to west direction. Additionally, the terminating elements in each terminal 510, 520 have corresponding losses (e.g., $L_{Tx,1}, L_{Tx,2}$ correspond to an equivalent Mux loss and $L_{Rx,2} L_{Rx,1}$ correspond to an equivalent demux loss).

Although each node has the lines connected to independent elements for ease of illustration, the independent east/west lines can be combined for purposes of amplification and dispersion compensation as illustrated in FIGS. 2 and 3A-C. Those skilled in the art will appreciate that this combination increases the complexity of the span loss measurement and amplifier gain adjustment because there is no guarantee that the loss on each line (e.g., 362, 364, 366 and 368) is going to be the same.

In general, two conditions can be used for setting the amplifier gain and VOA loss settings. First, the product of all amplifier gains and all passive and fiber losses from each transmitting terminal to each receiving terminal should be nominally same and within the dynamic range of the receiver. Second, amplifier gains should be adjusted such that the Signal to Noise Ratio (SNR) is maximized for the worst direction (e.g., east to west or west to east), while being constrained by the amplifier total output power.

Accordingly, in at least one embodiment of the invention, span losses can be set (e.g., via the VOAs) such that satisfactory transmission performance is obtained for eastbound and westbound signals (e.g., red and blue band wavelengths). An exemplary method of setting the span losses and related amplifier gain is described below and followed by a specific example.

Referring to FIG. 5, consider a network consisting of N nodes connected sequentially via westbound (e.g., 368) and eastbound fibers (e.g., 362). Node 1 is the west terminal, Nodes 2, 3, ... (N−1) can be OLAs, OADMs or other known elements, and Node N (e.g., 5) is the east terminal. Span losses are typically the transmission losses associated with the fiber cabling between adjacent nodes. The span losses are denoted by $L_{M,n}$ (dB), where $L_{M,n}$ is the loss of the span immediately east of Node M and supporting transmission in direction n. For illustrative purposes, consider n=2 to indicate the westbound direction and n=1 to indicate the eastbound direction.

In one embodiment all span-loss-adjusting VOAs at each node can be set to minimum attenuation. Each of the span losses can then be measured using a service channel power measurement on each span. The loss measurements across the network can be collected at any of the node processors via service channel telemetry.

For example, each of the measured span losses can be denoted as $L^0_{M,n}$. Any one of the processors with knowledge of the measured span losses $L^0_{M,n}$ then can execute an algorithm that determines attenuation values for each of the span-loss-adjusting VOAs in the network. An exemplary algorithm is described below.

First, the span losses for westbound and eastbound fibers are set to be equal. The processor calculates $L^1_{M,n}$, which is a calculated loss for each span and where:

$$L^1_{M,1} = \text{maximum}(L^0_{M,1}, L^0_{M,2}, \text{Gmin}_M) \quad (3)$$

and $$L^1_{M,2} = \text{maximum}(L^0_{M,1}, L^0_{M,2}, \text{Gmin}_M) \quad (4)$$

The function maximum (x, y, z) is a mathematical function that returns the maximum value of its discrete arguments, and $\text{Gmin}_M$ is the M node amplifier's minimum gain (e.g., a value dependent upon each amplifier's gain characteristic). However, one value for Gmin can also be selected for all amplifiers in the network.

Next, adjacent spans can be compared with each other (e.g., $L^1_{M,n}$ with $L^1_{M+1,n}$) to see if the adjacent span losses differ by greater than a threshold, ALLD (adjacent span loss difference). This comparison can be used to prevent signals transmitted in one direction from saturating the amplifier's gain, thus reducing the gain experienced by signals transmitted in the opposite direction. Accordingly a scaled loss $L^2_{M,n}$ can be calculated as:

$$L^2_{M,1} = \text{maximum}(L^1_{M,1}, L^1_{M+1,1} - ALLD) \quad (5)$$

and $$L^2_{M,2} = \text{maximum}(L^1_{M,2}, L^1_{M+1,2} - ALLD) \quad (6)$$

The target set points for the span-loss-adjusting VOAs can then be calculated as follows:

$$V_{M,n} = L^2_{M,n} - L^0_{M,n}, \quad (7)$$

where $V_{M,n}$ is a target set point of the VOA controlling the loss of the span immediately adjacent Node M and supporting transmission in direction N.

A node processor can then compute a series of amplifier gain values, as follows:

$$G_M = (L^2_{M-1,1} + L^2_{M,1})/2, \quad (8)$$

where $G_M$ is the target gain for the amplifier at Node M. However, note that some exceptions can exist at the network boundaries, such as:

at the west terminal 510, $$G_1 = (L_{Tx,1} + L^2_{1,1})/2, \quad (9)$$

and at the east terminal 520, $$G_M = (L^2_{M-1,1} + L_{Rx,1})/2, \quad (10)$$

where $L_{Tx,1}$ is the loss of the transmitter 514 (e.g., WDM multiplexer) at the west terminal 510 and $L_{Rx,1}$ is the loss of the received 524 (e.g., WDM demultiplexer) at the east terminal 520. Further, for purpose of this illustration, assume that the $L_{Tx}$ and $L_{Rx}$ in each terminal are substantially similar quantities and that they are the same at east 520 and west 510 terminals.

Once calculated, the node processor performing these computations can communicate to each node (e.g., via the service channel) the values of VOA set points ($V_{M,n}$) and amplifier gain values ($G_M$). For example, at OLA 310A (e.g., M=2) the amplifier module 310A will have a gain $G_2$. Accordingly, each node processor can set its pair of span-loss-adjusting VOAs (e.g., 376A and 386A) and amplifier gain (e.g., 320A) in accordance with the calculated values.

For further purposes of illustration and not limitation, a numerically based example illustrating aspects of the invention is provided below. For example, for the network illustrated in FIG. 5, consider the span losses $L^0_{M,n}$ indicated in Table 1. Further consider that, $G_{MIN}$=16 dB and ALLD=5 dB. $L^1_{M,n}$ can be calculated using equations (3) and (4). Likewise, $L^2_{M,n}$ can be calculated using equations (5) and (6). $V_{M,n}$ can be calculated using equation (7). These calculated values are tabulated in Table 1 below.

TABLE 1

| M | n | $L^0_{M,n}$ (dB) | $L^1_{M,n}$ (dB) | $L^2_{M,n}$ (dB) | $V_{M,n}$ (dB) |
|---|---|---|---|---|---|
| 1 | 1 | 12 | 16 | 18 | 6 |
| 2 | 1 | 23 | 23 | 23 | 0 |
| 3 | 1 | 25 | 25 | 25 | 0 |
| 4 | 1 | 21 | 22 | 22 | 1 |
| 1 | 2 | 15 | 16 | 18 | 3 |
| 2 | 2 | 22 | 23 | 23 | 1 |
| 3 | 2 | 24 | 25 | 25 | 1 |
| 4 | 2 | 22 | 22 | 22 | 0 |

Further, consider the case where $L_{Tx,1}=L_{Tx,2}=L_{Rx,1}=L_{Rx,2}$=20 dB, the gain at each amplifier can be calculate using equations (8), (9) and (10). The results for this example are illustrated in Table 2.

TABLE 2

| M | $G_M$ (dB) |
|---|---|
| 1 (West Terminal) | 19.0 |
| 2 | 20.5 |
| 3 | 24.0 |
| 4 | 23.5 |
| 5 (East Terminal) | 21.0 |

The following description and related figures illustrate various configurations of optical add/drop multiplexers (OADMs) using aspects of the amplifier module (see, e.g., FIGS. 3A-3C), as a common building block according to embodiments of the invention.

Figure 6A:
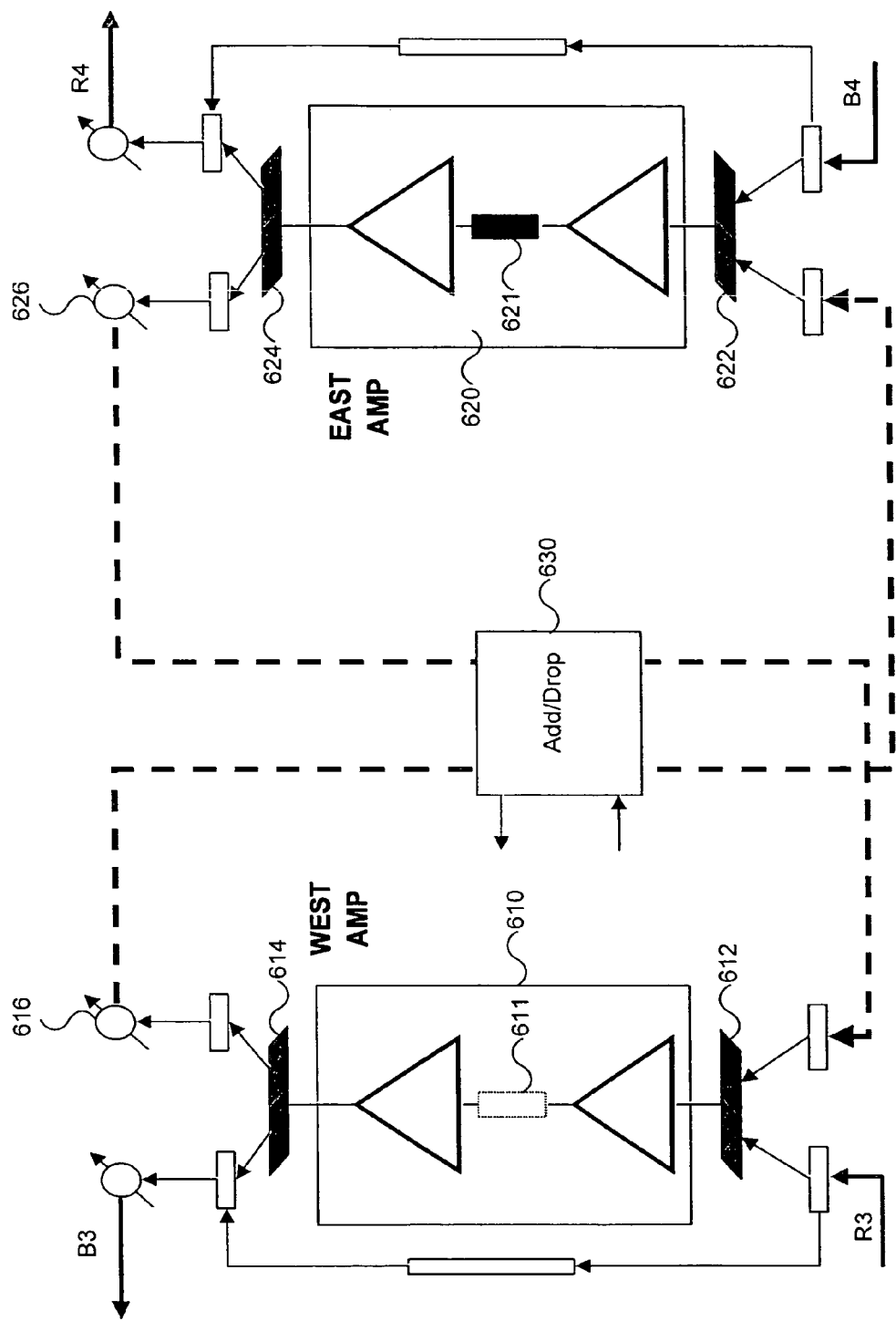
FIGS. 6A-B illustrate configurations of an add/drop node according to at least one embodiment of the invention.

Referring to FIG. 6A, aspects of at least one exemplary embodiment of the invention are illustrated. The OADM illustrated includes a first amplifier module 610. A first multiplexer 612 is coupled to an input of the first amplifier module 610. The first multiplexer 612 is configured to combine a first signal from a first input line R3 propagating in a first direction and a second signal. A first demultiplexer 614 is coupled to an output of the first amplifier module 610. The first demultiplexer 614 is configured to separate the first signal and the second signal from the combined signal received from the output of the first amplifier module 610. The second signal is propagated on a second output line B3 in a second direction.

A second amplifier module 620 includes a dispersion compensation module 621. A second multiplexer 622 is coupled to an input of the second amplifier module 620. The second multiplexer 622 combines the first signal and the second signal from a second input line B4 propagating in a second direction. A second demultiplexer 624 is coupled to an output of the second amplifier module 620. The second demultiplexer 624 separates the first signal and the second signal from the combined signal received from the second amplifier module 620. The first signal is propagated on a first output line R4 in a first direction.

An add/drop element 630 is coupled to the first demultiplexer 614 to receive the first signal and the second demultiplexer 624 to receive the second signal. The add/drop element 630 also is coupled to the first multiplexer 612 to output the second signal to the first multiplexer 612, and coupled to the second multiplexer 622 to output the first signal to the second multiplexer 622. The add/drop element 630 optionally adds and/or drops channels on the first and second signal.

The OADM node of FIG. 6A can be adapted to a variety of specific configurations. For example, the value (or existence) of DCMs 611 and 621 can be determined based on the type of dispersion compensation selected (as discussed above with relation to FIGS. 4A-4C). Additionally, those skilled in the art will appreciate that add/drop element 630 can be any component or subsystem that provides wavelength add/drop functionality. For example, add/drop element 630 can be blocking or non-blocking with respect to the wavelengths dropped. The wavelength routing of add/drop element 630 can either be static or dynamic. Further, any number of add/drop wavelengths can be supported by add/drop element 630.

Figure 6B:
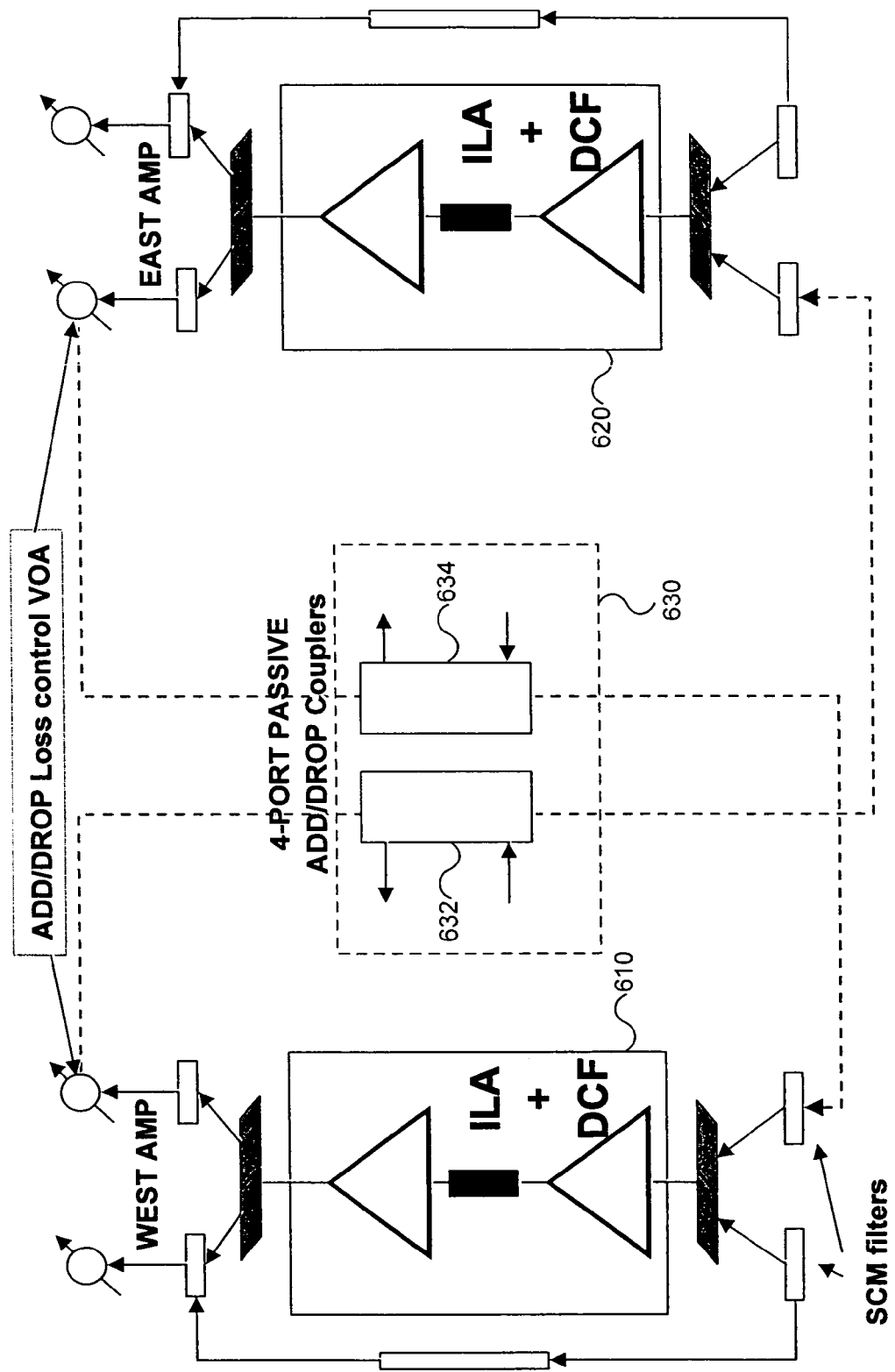

FIG. 6B illustrates further specifics of the configuration of an optical add/drop multiplexer (OADM) according to at least one embodiment of the invention. In this configuration there are two bidirectional amplifier modules and each amplifier module has a common DCF. The embodiment of FIG. 6B illustrates add/drop element 630 can include a first add/drop module 632 and a second add/drop module 634. The first add/drop module 632 is coupled between the first demultiplexer and the second multiplexer. The second add/drop module 634 is coupled between the second demultiplexer and the first multiplexer. Additional details of the various elements of line amplifier modules 610 and 620 are not further discussed as the elements are similar to those previously discussed.

The two red/blue line amplifier modules 610 and 620 allow for increased reliability for the add/drop node in this configuration, because add/drops 632 and 634 are each connected to both line amplifier modules 610 and 620. With this arrangement, the OADM has no single point of failure for the added and dropped channels. If one of modules 610 and 620 fail, both lines will not be completely down as the add/drops 632 and 634 are coupled to the other amplifier. For example, in the event of a failure of line amplifier module 610, add/drop 634 could still drop blue signals from module 620. Likewise, signals added at add/drop 632 can be passed through module 620 to red line output R4. The add/drops 610 and 620 can be blocking or non-blocking. Blocking OADMs can be Reconfigurable Blocking Filter (RBF) based, Reconfigurable-OADM (ROADM) based or fixed drop filter based.

Additionally, as illustrated, the add/drops 632 and 634 are located at a position where the express channels can have a low residual dispersion on both the east and west propagating directions. Further, as illustrated in FIG. 6B, there are two DCMs in the add/drop node, one per amplifier module. For example, line amplifier modules 610 and 620 can include a DCM (e.g., equal to −D3/2, and −D4/2, respectively). Alternatively, only one DCM could be provided and the respective optical paths can be pre-compensated/post-compensated as discussed herein.

Figure 7:
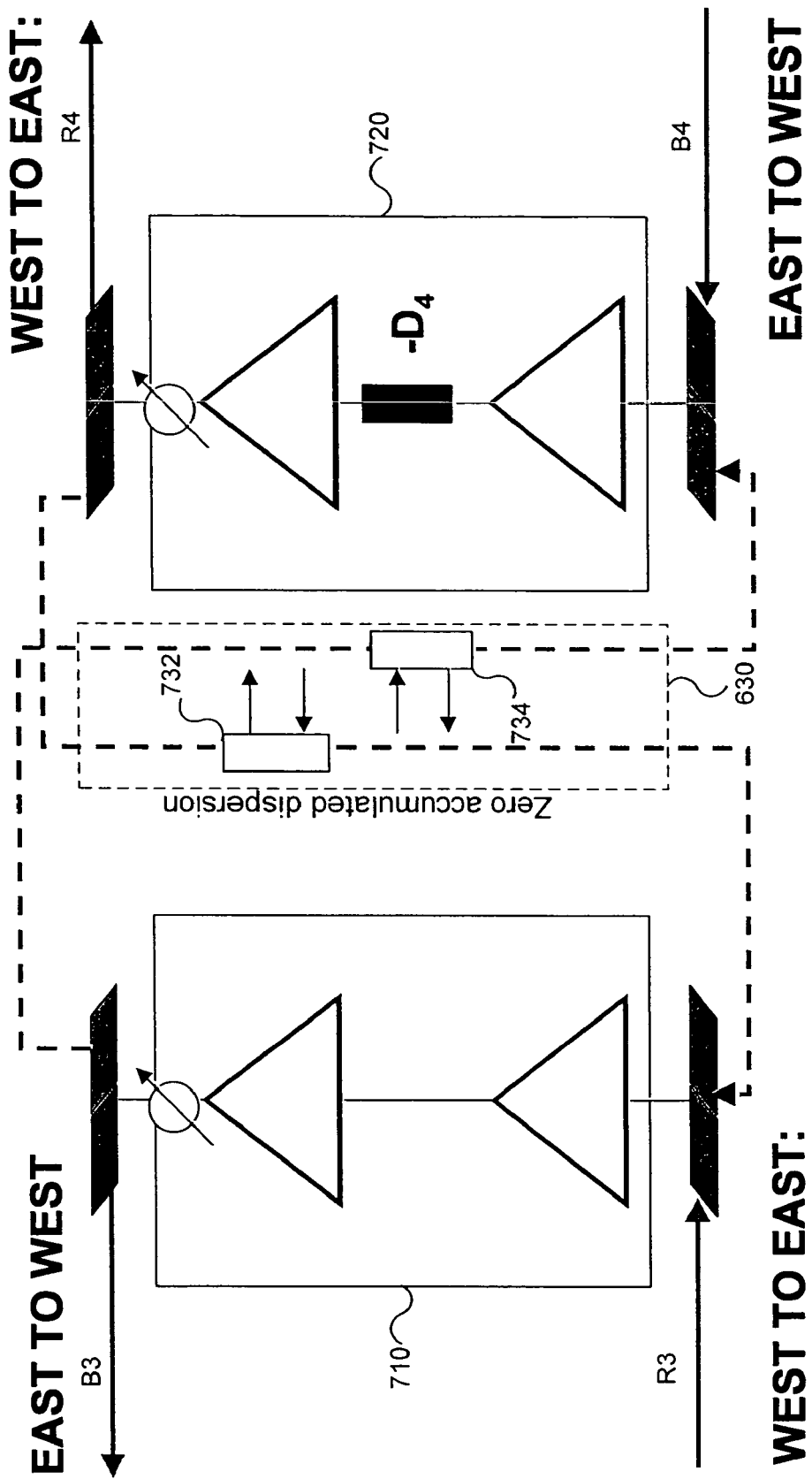
FIG. 7 illustrates a configuration of an add/drop node using two amplifier modules according to at least one embodiment of the invention.

Referring to FIG. 7, an alternative embodiment of an add/drop node is illustrated according to at least one embodiment of the invention. Line amplifier module 710 does not contain any DCM. Line amplifier module 710 does not need a DCM, because the west to east (red) signal was pre-compensated −D3 for fiber dispersion D3 in line R3, as illustrated in FIG. 4A. Accordingly, the fiber dispersion is compensated when incoming red line R3 reaches module 710. However, since the east to west (blue) signal is post-compensated, the blue signal on input line B4 needs to be compensated for fiber dispersion D4. Accordingly, a compensation value of −D4 is present in module 720, which compensates for the dispersion of line R4. Therefore, the dispersion of both incoming lines are compensated for by the time the signals reach add/drops 732 and 734 and the add/drops 732 and 734 can be located at a position that has low or no dispersion (e.g., between the amplifier modules), as discussed above. Further, the red signal on line R4 is pre-compensated −D4 in module 720 for fiber dispersion D4 in line R4. The blue signal on line B3 has no pre-compensation in module 710.

Figure 8A:
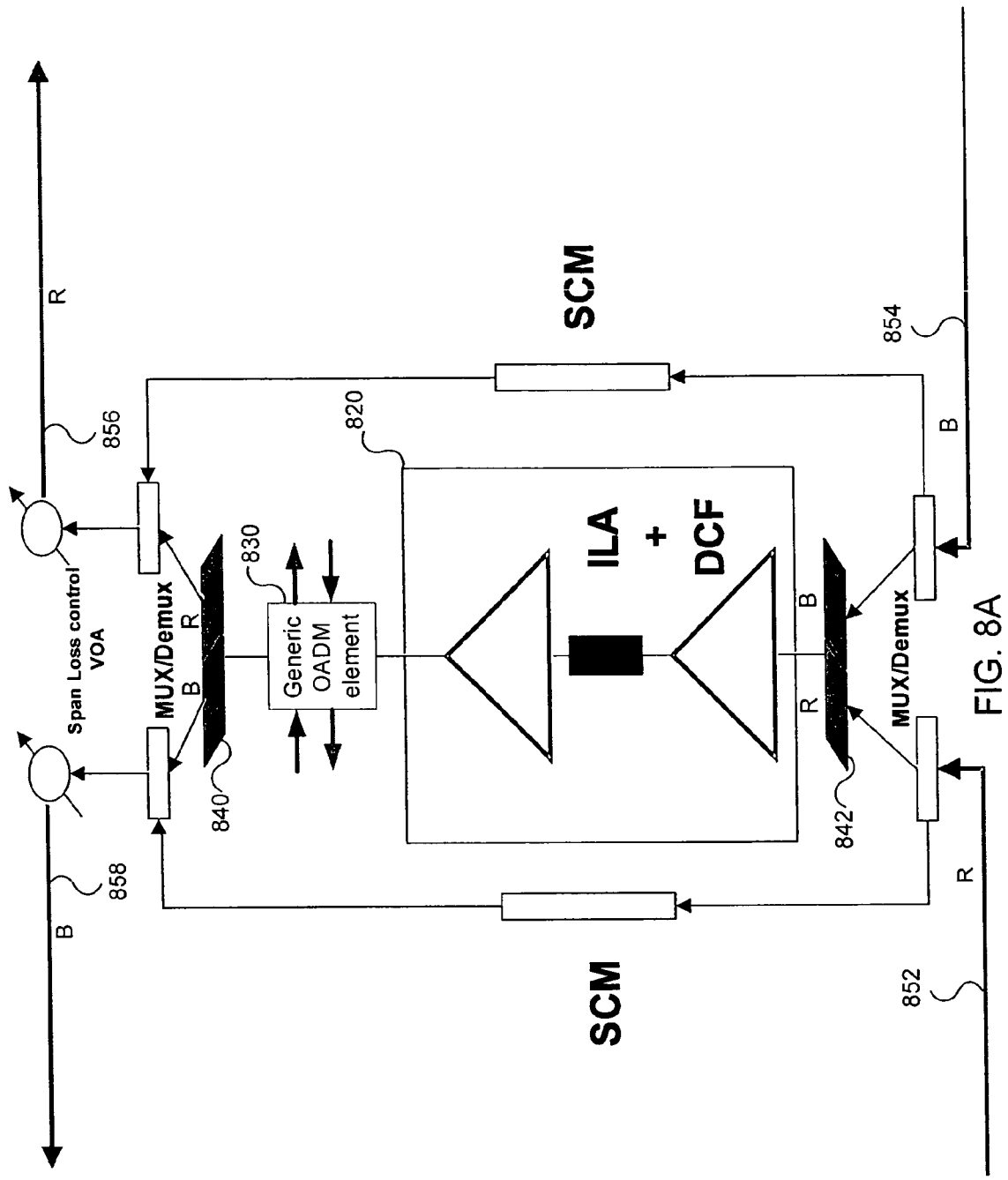
FIGS. 8A and 8B illustrate configurations of an add/drop node using a single amplifier module according to embodiments of the invention.

FIG. 8A illustrates an alternate configuration of an add/drop node according to at least one embodiment of the invention. The add/drop node is similar to the optical line amplifier node, described in relation to FIGS. 3A-3B. Once again, common elements are not described in detail herein. A red line 852 and a blue line 854 are combined in multiplexer 842. The amplifier module 820 amplifies the combined signal and compensates for the fiber dispersion. Likewise, VOAs are provided to adjust for span loss. However, the output of module 820 is coupled to an add/drop element 830 before the signal is demultiplexed in demultiplexer 840. The output of add/drop element 830 containing the combined red/blue signals is coupled to demultiplexer 840, which separates the red and blue signals to respective west to east 856 and east to west 858 lines. Those skilled in the art will appreciate that add/drop element 830 can be any component or subsystem that provides wavelength add/drop functionality. Accordingly, add/drop element 830 can be blocking or non-blocking with respect to the wavelengths dropped. The wavelength routing of add/drop element 830 can either be static or dynamic. Further, any number of add/drop wavelengths can be supported by add/drop element 830. For example, add/drop element 830 can be a Blocking OADM, which can be Reconfigurable Blocking Filter (RBF) based, Reconfigurable-OADM (ROADM) based or fixed drop filter based.

Figure 8B:
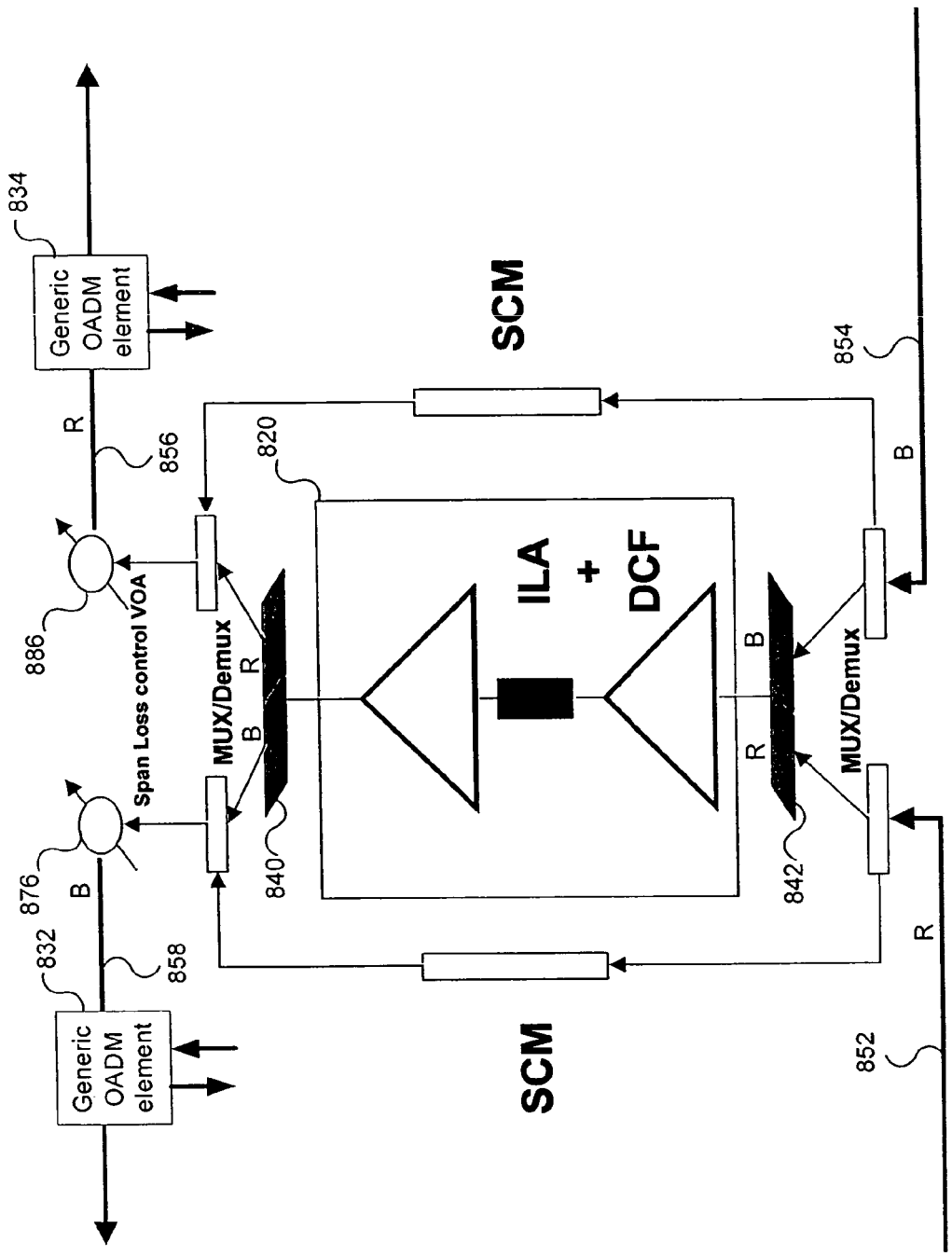

Referring to FIG. 8B, another embodiment of a single bidirectional amplifier OADM node is illustrated. Once again, the add/drop node is similar to the optical line amplifier node, described in relation to FIGS. 3A-3B. Accordingly, not all elements are described in detail herein as some are similar to elements previously described. As illustrated in FIG. 8B, there are two add/drop elements 832 and 834 in this configuration. Add/drop element 832 is located on the blue line 858 output of VOA 876. Likewise, add/drop element 842 is located on the red line 856 output of VOA 886. Accordingly, the loss balancing can be performed with red/blue (R/B) span loss control VOAs 876, 886 prior to the add/drop elements 832, 834 for each line 858, 856. Therefore, the embodiment of FIG. 8B allows for greater individual conditioning of the signals of each band (R, B) prior to the adding and/or dropping of any wavelengths. However, the configuration illustrated in FIG. 8B has no amplifier redundancy, as is also the case in FIG. 8A.

As with elements 630 and 830, each add/drop element 832, 834 can be any component and/or subsystem that provides wavelength add/drop functionality. Further, each add/drop element 832, 834 can be the same or different type of component/subsystem. Accordingly, each add/drop element 832, 834 can be blocking or non-blocking with respect to the wavelengths dropped. The wavelength routing of add/drop elements 832, 834 can either be static or dynamic. Further, any number of add/drop wavelengths can be supported by add/drop elements 832, 834. For example, each add/drop element 832, 834 can be a Blocking OADM, which can be Reconfigurable Blocking Filter (RBF) based, Reconfigurable-OADM (ROADM) based or fixed drop filter based.

Figure 9:
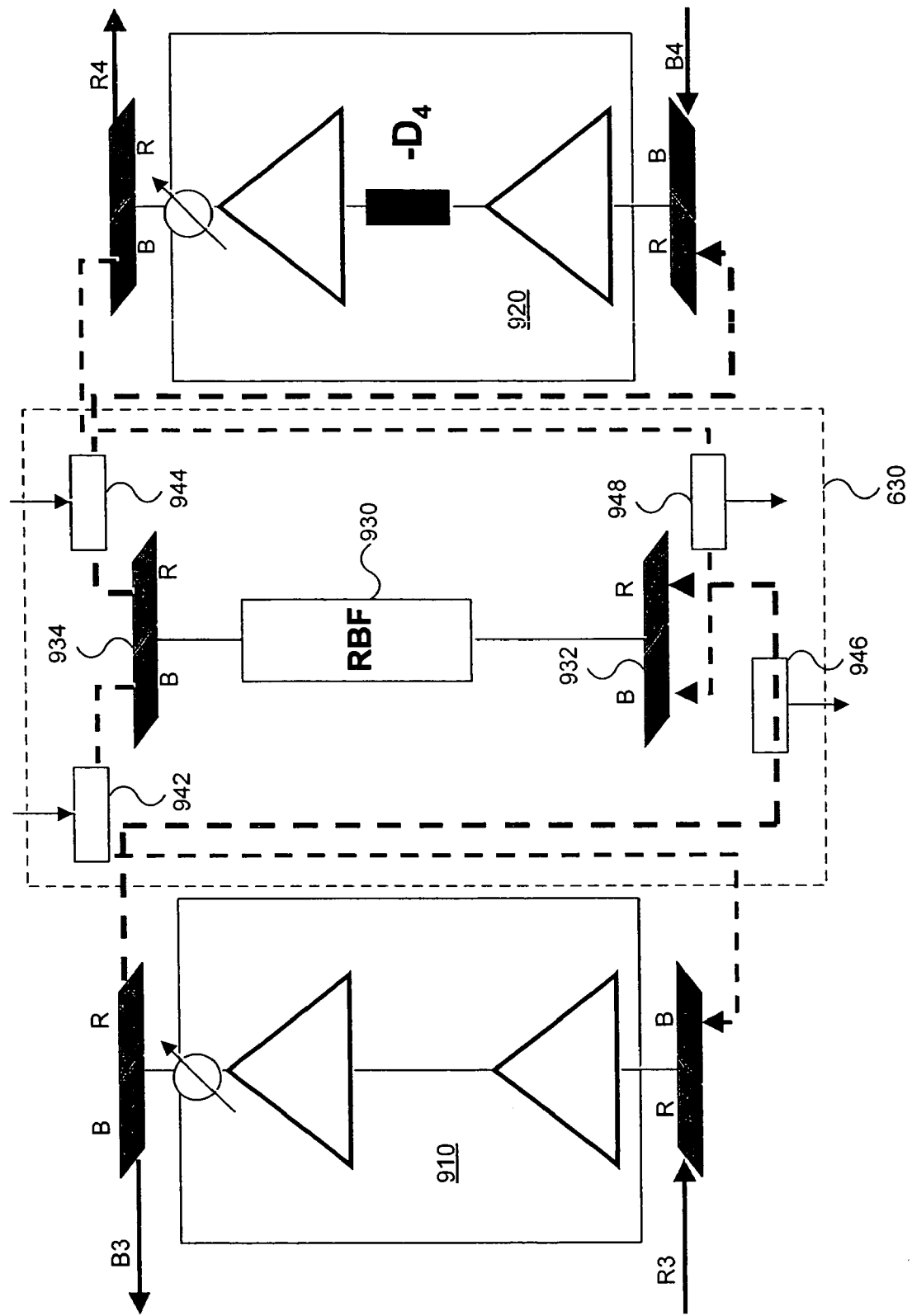
FIG. 9 illustrates a configuration of an add/drop node using a reconfigurable blocking filter according to at least one embodiment of the invention.

FIG. 9 illustrates another configuration of an add/drop node according to at least one embodiment of the invention. Both the DCM of module 920 and the RBF 930 are shared in this configuration. Amplifier module 910 contains no DCM (e.g., DCF) and serves to amplify the incoming red line R3, which does not need compensation as it was pre-compensated, as discussed in relation to FIG. 7. Also, as discussed in relation to the previous configurations, adds 942, 944 and drops 946, 948 are coupled between the amplifier modules 910 and 920 but to different outputs and inputs, respectively. This provides resiliency as discussed above. For example, if amplifier module 910 fails, the output of amplifier module 920 is still active and drop 948 is still viable. Likewise, add 944 can still provide signals to module 920 and this portion of the add/drop will not be down due to the failure of amplifier module 910.

Also, as illustrated in FIG. 9, the RBF 930 can be shared with both the red and blue lines. For example, the blue line after drop 948 is coupled to multiplexer 932. Further, the red line, output from amplifier module 910 is coupled to multiplexer 932, after drop 946. Multiplexer 932 combines the red and blue signals and the combined signal is fed to RBF 930. The filtered output of RBF 930 is then coupled to demultiplexer 934, where the combined signal is separated into a red signal and blue signal and directed to red and blue lines, respectively. Each of these lines are passed through subsequent adds 944 and 942 and amplifier modules 920 and 910, respectively, and eventually propagated on outputs R4 and B3, respectively. As illustrated, multiplexer 932, demultiplexer 934, common reconfigurable blocking filter (RBF) 930, add elements 942, 946 and drop elements 946, 948 form the add/drop element 630.

Figure 10:
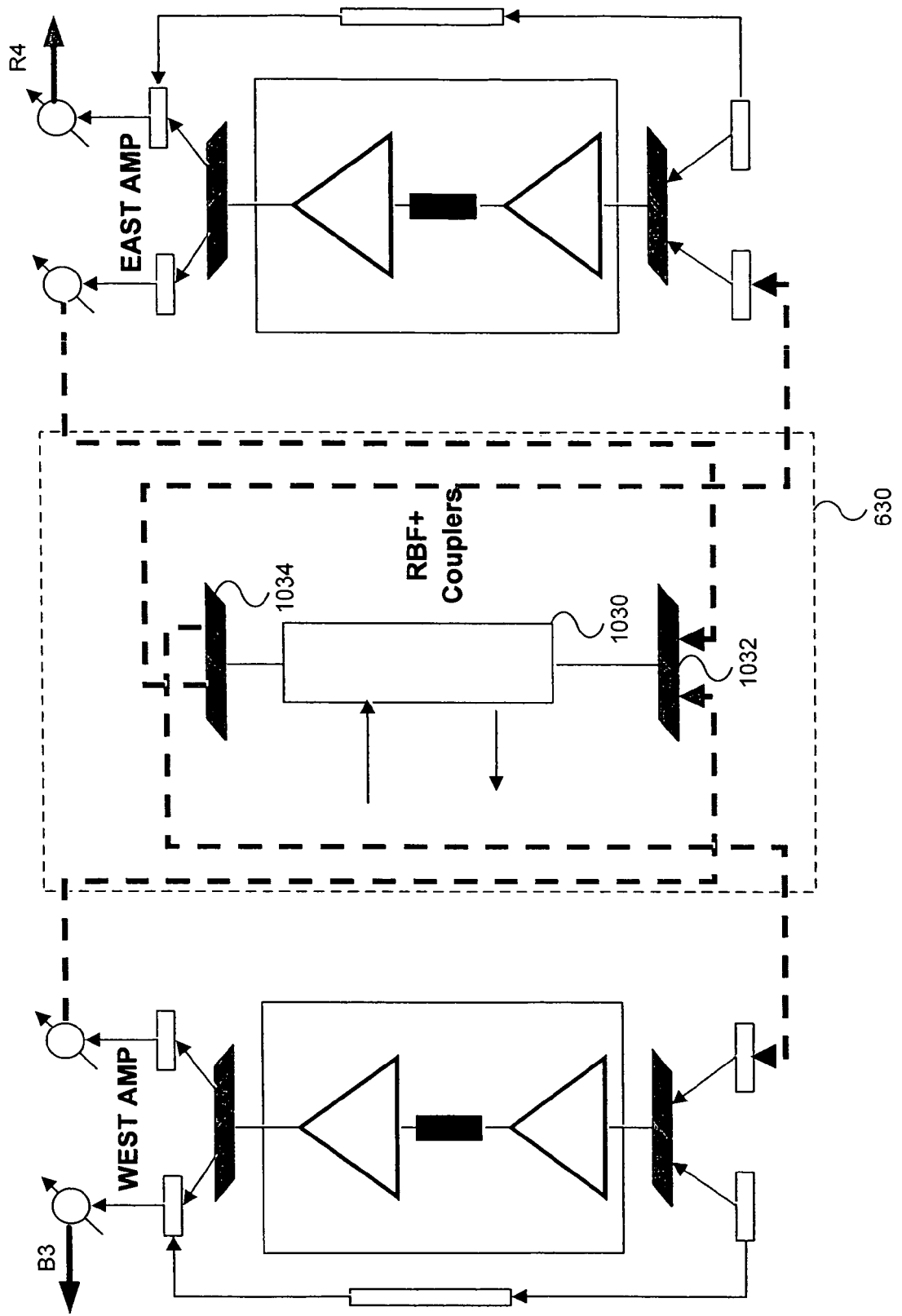
FIG. 10 illustrates an alternate configuration of an add/drop node using a reconfigurable blocking filter according to at least one embodiment of the invention.

FIG. 10 illustrates another configuration of an optical add/drop multiplexer (OADM) node according to at least one embodiment of the invention. In this configuration there are also two bidirectional amplifier modules. Each amplifier module has a common DCF. The RBF module 1030 contains couplers for add/drop functionality and can be shared with both the red and blue lines. For example, multiplexer 1032 combines the red and blue signals and the combined signal is fed to RBF module 1030. The filtered output of the RBF module 1030 is then coupled to demultiplexer 1034, where the combined signal is separated into a red signal and a blue signal and directed to red and blue lines, respectively. Each of these lines is eventually propagated on outputs R4 and B3, respectively. As illustrated, multiplexer 1032, demultiplexer 1034, and common RBF module 1030 can form the add/drop element 630.

In view of the foregoing disclosure, those skilled in the art will recognize that embodiments of the invention include methods of performing the sequence of actions, operations and/or functions discussed herein. For example, methods of practicing embodiments of the invention can be appreciated from the span loss adjusting description in relation to FIG. 5 and the DCM determinations disclosed in relation to FIGS. 4A-4C. Further, other methods and alternatives can be recognized by those skilled in the art, and these examples and related illustrations are not intended as limiting of the methods disclosed herein.

Accordingly, the foregoing description and accompanying drawings illustrate the principles, preferred embodiments and modes of operation of the invention. However, the invention should not be construed as being limited to the particular embodiments discussed above. Additional variations of the embodiments discussed above will be appreciated by those skilled in the art. For example, although multiplexers and demultiplexers are illustrated and discussed in the foregoing description, any element that can combine and separate the respective signals (e.g., red and blue bands) can be used and the terms multiplexer and demultiplexer are intended to be broadly construed as any such element.

Therefore, the above-described embodiments should be regarded as illustrative rather than restrictive. Accordingly, it should be appreciated that variations to the above-described embodiments can be made by those skilled in the art without departing from the scope of the invention as defined by the following claims.

What is claimed is:

1. An apparatus comprising:
    a first multiplexer having a first input and a second input, wherein the first multiplexer is configured to combine first band signals at the first input and second band signals at the second input and generate a first combined signal, wherein the first band signals are propagating in a first direction and the second band signals are propagating in a second direction;
    a first amplifier module coupled to the first multiplexer to receive and amplify the first combined signal, wherein the first amplifier module includes a first dispersion compensation module configured to compensate dispersion in the first combined signal; and
    a first demultiplexer having a first output and second output and an input coupled to the first amplifier module, wherein the first demultiplexer is configured to separate the first band signals and second band signals from the first combined signal and to redirect the first band signals to the first output and the second band signals to the second output of the first demultiplexer.

2. The apparatus of claim 1, wherein a dispersion compensation of the dispersion compensation module is determined as a ratio of a first fiber dispersion of the first line and a second fiber dispersion of the second line.

3. The apparatus of claim 2, wherein the ratio is N1*–D1+N2*–D2, wherein D1 is the first fiber dispersion, D2 is the second fiber dispersion, and N1 and N2 each has a range of 0.0 to 1.0.

4. The apparatus of claim 2, wherein the ratio is N*–D1+(1–N)*–D2, wherein D1 is the first fiber dispersion, D2 is the second fiber dispersion, and N is at least 0.5.

5. The apparatus of claim 1 further comprising:
    a first terminal having a transmitter configured to propagate the first signal in the first direction and a receiver configured to receive the second signal propagating in the second direction; and
    a second terminal having a transmitter configured to propagate the second signal in the second direction and a receiver configured to receive the first signal propagating in the first direction.

6. The apparatus of claim 1, wherein the first band signals are red band signals and the second band signals are blue band signals.

7. The apparatus of claim 1, wherein the apparatus is at least one of an optical amplifier, an optical amplifier node, and a bidirectional optical communication system.

8. The apparatus of claim 1, further comprising:
    a first variable optical attenuator (VOA) coupled to one of the first input of the first multiplexer and the second output of the second demultiplexer; and
    a second variable optical attenuator (VOA) coupled to one of the second input of the first multiplexer and the first output of the second demultiplexer.

9. The apparatus of claim 8, further comprising:
    a first service channel modem (SCM) configured to measure power loss on the first line and configured to adjust the first VOA; and
    a second service channel modem (SCM) configured to measure power loss on the second line and configured to adjust the second VOA.

10. The apparatus of claim 9, wherein at least one of the first SCM and second SCM is configured to adjust the gain of the amplifier module.

11. The apparatus of claim 1, further comprising:
    a second multiplexer having a first input and a second input, wherein the second multiplexer is configured to combine the first band signals at the first input and the second band signals at the second input and generate a second combined signal;
    a second amplifier module coupled to the second multiplexer to receive and amplify the second combined signal;
    second demultiplexer having a first output and second output coupled to the second amplifier module, wherein the second demultiplexer is configured to separate the first band signals and second band signals from the second combined signal and to redirect the first band signals to the first output and the second band signals to the second output of the second demultiplexer; and
    an add/drop module coupled to the first output of the second demultiplexer and the first input of the first multiplexer and coupled to the second output of the first demultiplexer and the second input of the second multiplexer.

12. The apparatus of claim 11, wherein the second amplifier module includes a first dispersion compensation module configured to compensate dispersion in the second combined signal.

13. The apparatus of claim 11, wherein the add/drop module is at least one of a blocking and non-blocking.

14. The apparatus of claim 11, wherein the add/drop module is configured to support static wavelength routing.

15. The apparatus of claim 11, wherein the add/drop module is configured to support dynamic wavelength routing.

16. The apparatus of claim 11, wherein the add/drop module is configured to add at least wavelength within one of the first and the second bands.

17. The apparatus of claim 11, wherein the add/drop module is configured to drop at least one wavelength within one of the first and the second bands.

18. The apparatus of claim 11, wherein the add/drop module comprises at least one of a Reconfigurable Blocking Filter (RBF), a Reconfigurable-OADM (ROADM), and a fixed filter.

19. The apparatus of claim 1, further comprising:
    an add/drop module coupled between the first amplifier module and the first demultiplexer.

20. The apparatus of claim 19, wherein the add/drop module is at least one of a blocking and non-blocking.

21. The apparatus of claim 19, wherein the add/drop module is configured to support static wavelength routing.

22. The apparatus of claim 19, wherein the add/drop module is configured to support dynamic wavelength routing.

23. The apparatus of claim 19, wherein the add/drop module comprises at least one of a Reconfigurable Blocking Filter (RBF), a Reconfigurable-OADM (ROADM), and a fixed filter.

24. The apparatus of claim 1, further comprising:
a first add/drop module coupled to first output of the demultiplexer; and
a second add/drop module coupled to the second output of the first demultiplexer.

25. The apparatus of claim 24, wherein the add/drop module is at least one of a blocking and non-blocking.

26. The apparatus of claim 24, wherein the add/drop module is configured to support static wavelength routing.

27. The apparatus of claim 24, wherein the add/drop module is configured to support dynamic wavelength routing.

28. The apparatus of claim 24, wherein the add/drop module comprises at least one of a Reconfigurable Blocking Filter (RBF), a Reconfigurable-OADM (ROADM), and a fixed filter,
first and the second bands.

* * * * *